(12) United States Patent
Hass et al.

(10) Patent No.: US 10,780,993 B2
(45) Date of Patent: Sep. 22, 2020

(54) AIRCRAFT CONSTRUCTION PROTECTION APPARATUS

(71) Applicant: The Boeing Company, Chicago, IL (US)

(72) Inventors: Brian M. Hass, Lynnwood, WA (US); David J. Zimmer, Kirkland, WA (US); Christopher J. Wheaton, Mukilteo, WA (US); Jeffrey J. Ravenberg, Deming, WA (US); Kelli Dawn Simon, Tulalip, WA (US)

(73) Assignee: The Boeing Company, Chicago, IL (US)

( * ) Notice: Subject to any disclaimer, the term of this patent is extended or adjusted under 35 U.S.C. 154(b) by 1302 days.

(21) Appl. No.: 14/706,248

(22) Filed: May 7, 2015

(65) Prior Publication Data

US 2016/0325847 A1    Nov. 10, 2016

(51) Int. Cl.
*B64F 1/00*    (2006.01)

(52) U.S. Cl.
CPC .................................. *B64F 1/005* (2013.01)

(58) Field of Classification Search
CPC ....................................................... B64F 1/005
USPC .... 248/688, 676, 677, 678, 163.1, 165, 166, 248/168, 170, 436, 439, 440, 440.1, 248/188.6, 188.8; 108/162, 165, 166, 108/167, 171, 176; 297/423.41, 423.39
See application file for complete search history.

(56) References Cited

U.S. PATENT DOCUMENTS

| | | | | |
|---|---|---|---|---|
| 490,991 A | * | 1/1893 | Smith | E04G 1/30 108/115 |
| 587,518 A | * | 8/1897 | Bartelle | A47B 3/087 108/171 |
| 1,435,738 A | * | 11/1922 | Abraham | E04G 1/34 182/155 |
| 1,520,589 A | * | 12/1924 | Matkovic | A61G 15/002 248/439 |
| 1,811,674 A | * | 6/1931 | Longley | A47C 12/02 108/171 |
| 1,862,911 A | * | 6/1932 | Snyder | A47B 3/02 108/171 |
| 2,596,986 A | * | 5/1952 | Claud | A61G 13/105 108/147.22 |
| 2,639,114 A | * | 5/1953 | Allen | A63F 7/025 248/167 |
| 2,709,631 A | * | 5/1955 | Covucci | A47B 3/087 108/167 |
| 4,070,057 A | * | 1/1978 | Jones | A47B 3/14 108/167 |

(Continued)

*Primary Examiner* — Terrell L McKinnon
*Assistant Examiner* — Michael McDuffie
(74) *Attorney, Agent, or Firm* — Joseph M. Rolnicki; Evans & Dixon, L.L.C.

(57) ABSTRACT

A protection apparatus employed in the construction of aircraft can be collapsed to a small configuration to enable insertion of the apparatus to access openings in a structure of the aircraft, for example an access opening in a wing of the aircraft, to position the protection apparatus inside the aircraft structure. Once inside the aircraft structure, the protection apparatus can be expanded from its collapsed configuration and positioned over components in the aircraft structure, for example hydraulic tubing or electric wiring, to protect those components from damage by a worker working in the aircraft structure above the components.

20 Claims, 8 Drawing Sheets

(56) References Cited

U.S. PATENT DOCUMENTS

| | | | | |
|---|---|---|---|---|
| 4,383,488 | A * | 5/1983 | Macho | A47B 3/08 |
| | | | | 108/129 |
| 4,721,046 | A * | 1/1988 | Cionini | A47B 13/02 |
| | | | | 108/150 |
| 4,807,766 | A * | 2/1989 | Compagnucci | D06F 57/08 |
| | | | | 211/198 |
| 5,887,531 | A * | 3/1999 | Covill | A47B 3/083 |
| | | | | 108/131 |
| 7,278,515 | B2 * | 10/2007 | Moser | E04G 1/28 |
| | | | | 108/169 |
| 8,291,841 | B2 * | 10/2012 | Correia de Castro | |
| | | | | B25H 1/0014 |
| | | | | 108/162 |
| 8,496,289 | B2 * | 7/2013 | Chen | A47B 3/083 |
| | | | | 108/130 |
| 8,661,991 | B2 * | 3/2014 | Eveleth | A47B 3/08 |
| | | | | 108/115 |
| 2011/0181091 | A1 * | 7/2011 | Kim | A47C 16/025 |
| | | | | 297/423.41 |

* cited by examiner

AIRCRAFT CONSTRUCTION PROTECTION APPARATUS

FIELD

This disclosure pertains to a protection apparatus employed in the construction of aircraft. In particular, this disclosure pertains to a protection apparatus that can be collapsed to a small configuration to enable its insertion through access openings in a structure of an aircraft, for example an access opening in a wing of an aircraft, to position the protection apparatus inside the aircraft structure. Inside the aircraft structure the protection apparatus can be expanded from its collapsed configuration and positioned over components in the aircraft structure, for example hydraulic tubing or electric wiring, to protect those components from damage by a worker working in the aircraft structure above the components.

BACKGROUND

In the construction of aircraft it is often necessary to access an interior of a structure of the aircraft, for example a previously constructed aircraft wing in order to continue the construction of components inside the aircraft structure. Aircraft structures are typically constructed with access openings having panels covering the access openings. Each panel can be removed exposing the access opening and the interior of the structure. A worker can then pass through the access opening and continue to work on components of the aircraft located in the interior of the aircraft structure.

Because there are previously constructed components inside the aircraft structure such as hydraulic tubing or electrical wiring, a worker entering the interior of the aircraft structure to continue work on other components must be careful to avoid damage to these previously constructed components. For example, the worker must be vigilant not to damage hydraulic tubing in an aircraft structure such as an aircraft wing by the worker dropping a tool on the tubing or by the worker unintentionally making damaging contact with the tubing while moving through the interior of the wing. The caution the worker must take when moving through the interior of the aircraft structure when continuing the construction of component parts inside the aircraft structure significantly contributes to the time needed to complete the construction of components in the aircraft structure. Furthermore, replacing internal components of an aircraft structure that have been inadvertently damaged by workers working inside the aircraft structure can add to the cost of the aircraft construction and the time required for the aircraft construction.

SUMMARY

A protection apparatus disclosed herein can be used by a worker in the interior of an aircraft structure to avoid unintentionally damaging previously constructed components inside the aircraft structure. The apparatus can be collapsed by the worker to a reduced size configuration to enable insertion of the apparatus through an access opening in the aircraft structure. Once inside the aircraft structure, the apparatus can then be expanded by the worker to a larger configuration inside the aircraft structure. The apparatus is then positioned over previously constructed components of the aircraft inside the aircraft structure to protect those previously constructed components from potential damage by the worker working inside the aircraft structure in the vicinity of the previously constructed components.

The protection apparatus is basically comprised of a first part and a second part that are mirror images of each other. The first and second parts can be constructed of rigid plastic or any other equivalent material that provides the parts with the structural strength the parts need for their intended function, yet is light weight to enable the apparatus to be easily manipulated.

The first part of the apparatus has a support surface area on a top of the first part. The first part also has a bottom surface area opposite the support structure area.

A first support leg is provided on the bottom surface area. The first support leg projects outwardly from the bottom surface to a distal end of the first support leg.

The second part of the apparatus also has a support surface area on a top of the second part and a bottom surface area opposite the support surface area.

A second support leg is also provided on the bottom surface area of the second part. The second support leg projects outwardly from the second bottom surface area to a distal end of the second support leg.

A connection, for example a hinge connection connects the first part and the second part. The connection enables the first part and the second part to move between first relative positions and second relative positions of the first part and second part. In the first relative positions the first part and second part are moved or folded about the hinge connection to a collapsed, reduced size configuration. In the first relative positions the distal ends of the first support leg and the second support leg are moved toward each other to positions where they are adjacent. Additionally, the first support surface area and the second support surface area are moved toward each other and oriented at an angle. This collapsed configuration of the apparatus provides the apparatus with a reduced size configuration and enables the apparatus to be inserted through an access opening in an aircraft structure and into the interior of the aircraft structure.

Once in the interior of the aircraft structure, a worker can move the collapsed apparatus to a work site location in the interior where the apparatus is used to protect previously constructed components of the aircraft structure while further construction is performed by the worker in the aircraft structure interior.

Once at the work site in the aircraft structure interior, the apparatus can then be unfolded to its enlarged configuration where the first part and the second part are moved to their second relative positions. In the second relative positions of the first part and second part, the distal ends of the first support leg and the second support leg are spaced from each other. The spacing between the distal ends of the first support leg and second support leg enables the legs to be positioned on an interior surface of the aircraft structure on opposite sides of a previously constructed component to be protected by the apparatus. Additionally, the distance between the distal ends of the first support leg and second support leg enables the support legs to be positioned against adjacent stringers in the interior of the aircraft structure. This engagement of the support legs with the adjacent stringers provides further support to the apparatus. In the second relative positions of the first part and second part, the first support area and second support area form a continuous support surface over the previously constructed components in the interior of the aircraft structure. This continuous support surface protects the previously constructed components from potential damage by the worker working at the work site, for example from a dropped tool or a worker inadvertently exerting a force against the previously constructed component.

The features, functions, and advantages that have been discussed can be achieved independently in various embodiments or may be combined in yet other embodiments, further details of which can be seen with reference to the following description and drawings.

DESCRIPTION

Figure 1:
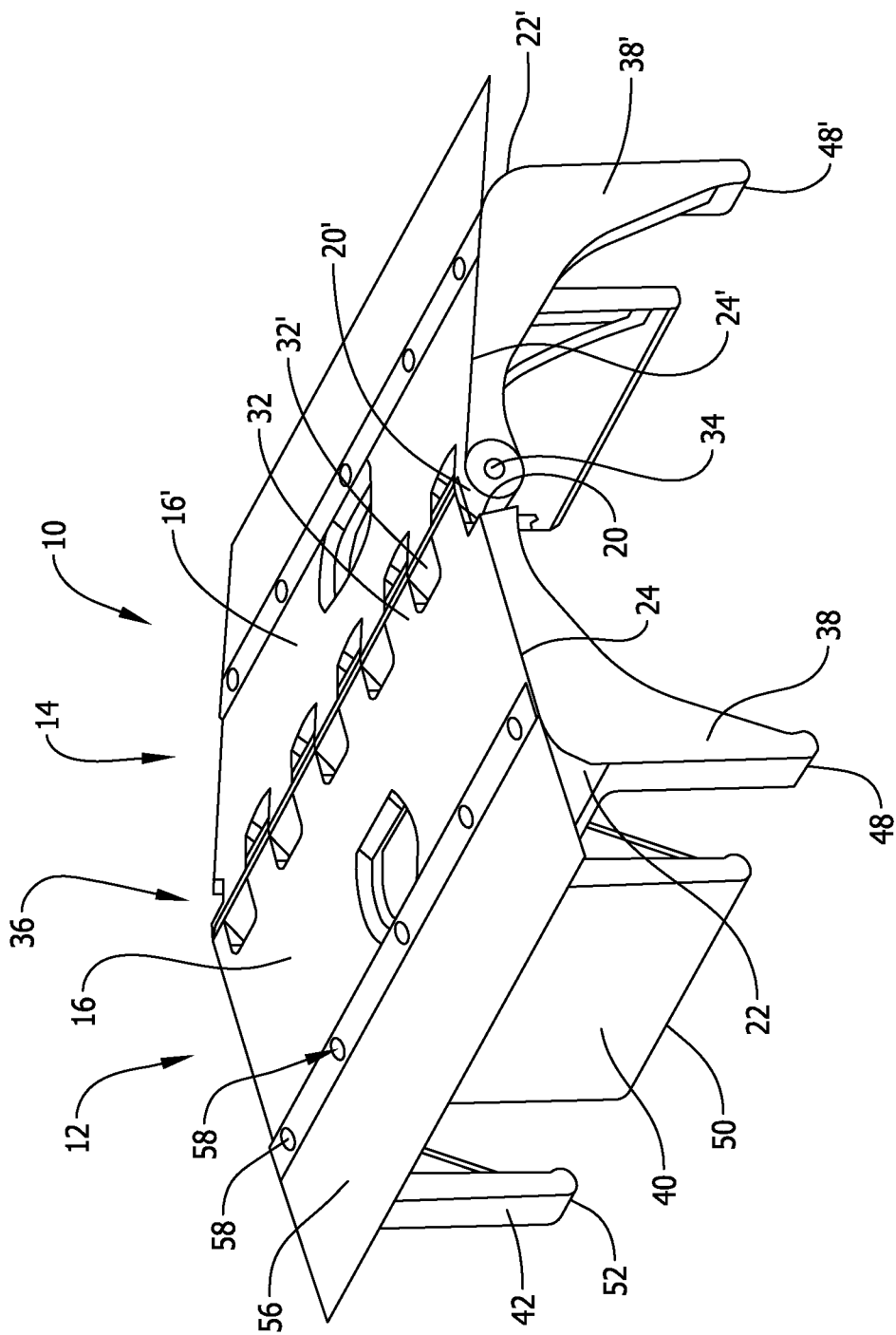
FIG. 1 is a perspective view of the protection apparatus.
Figure 2:
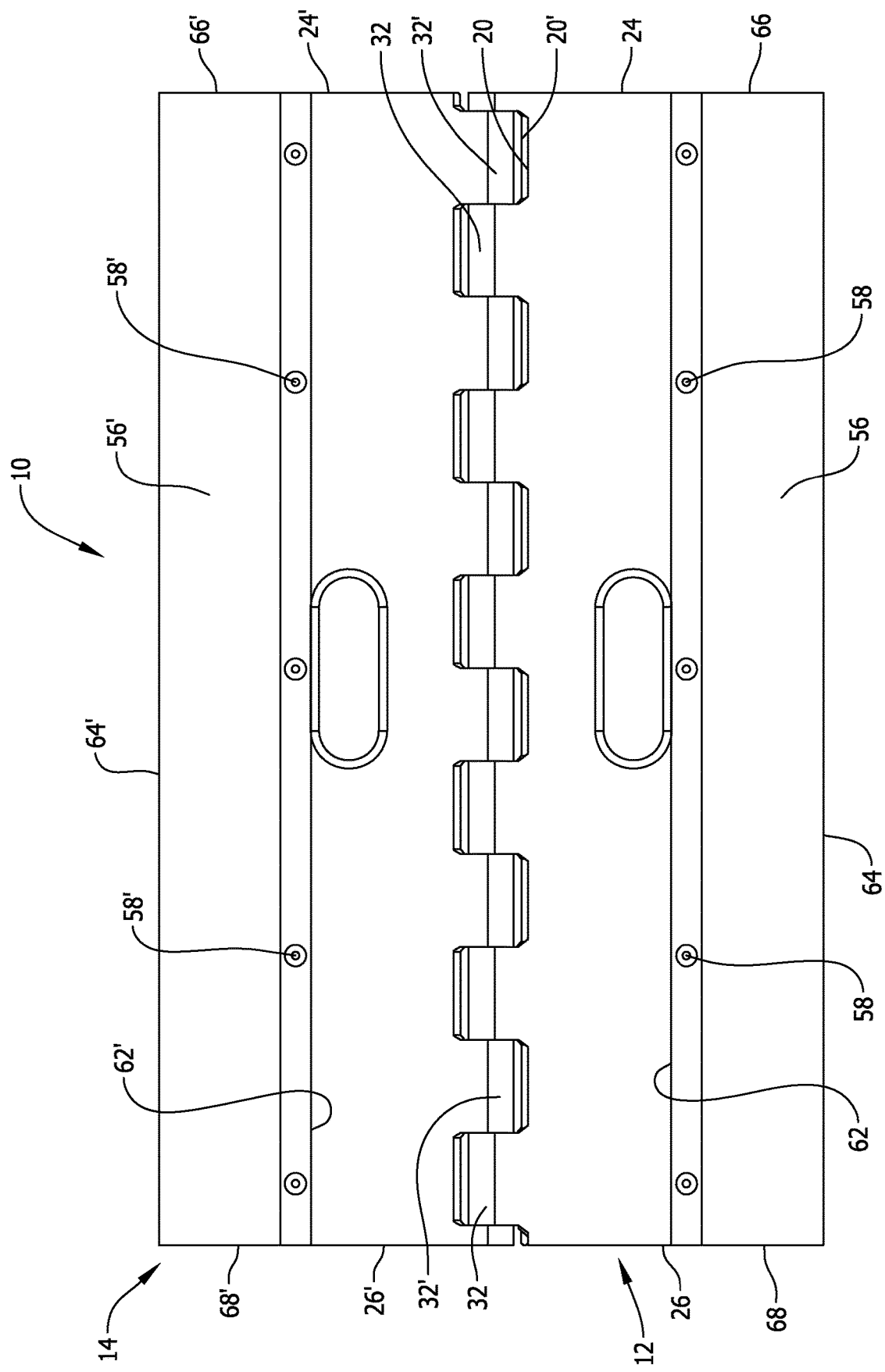
FIG. 2 is a top plan view of the protection apparatus.
Figure 3:
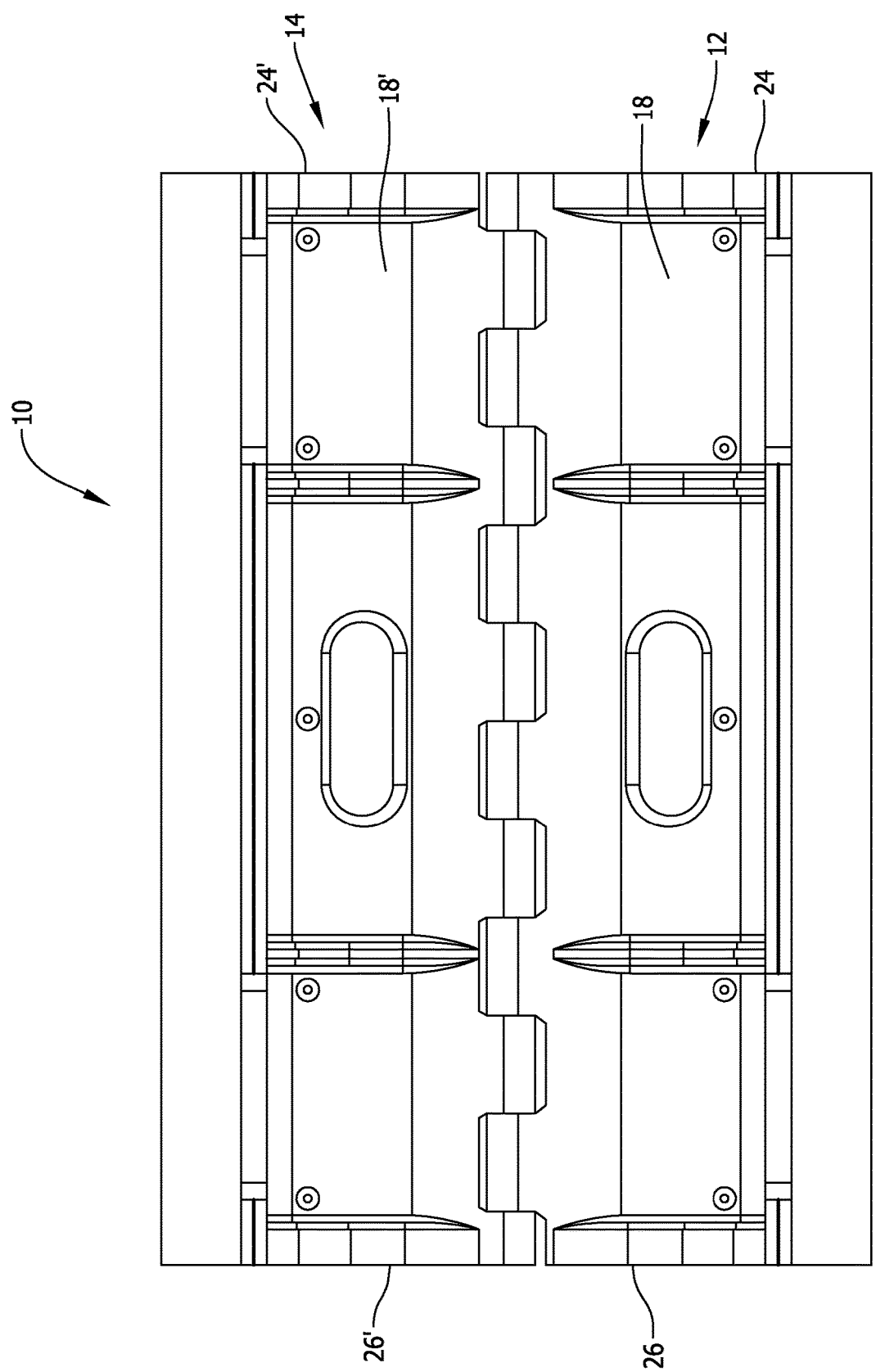
FIG. 3 is a bottom plan view of the protection apparatus.

FIG. 1 is a perspective view of the protection apparatus 10 of this disclosure in an expanded, enlarged configuration of the apparatus 10. As stated earlier, the apparatus 10 is constructed of two parts 12, 14 that are mirror images of each other. Both the first part 12 and the second part 14 are constructed of materials that provide the apparatus 10 with sufficient strength for its intended purpose, without significantly increasing the weight of the apparatus. This enables the apparatus 10 to be easily manipulated and moved by a worker. For example, the first part 12 and the second part 14 could be constructed of rigid plastic, or other equivalent materials. Because the first part 12 and the second part 14 are mirror images of each other, only the first part 12 will be described in detail herein. The reference numbers used to label the first part 12 will also be used to label corresponding portions of the second part 14, but with the reference number followed by a prime (').

The first part 12 of the apparatus 10 has a support surface area 16 on a top of the first part. The first part 12 also has a bottom surface 18 opposite the top surface area 16. The support surface areas 16, 16' of both the respective first part 12 and second part 14 make up the support surface on the top of the apparatus 10. The first support surface area 16 is planar and has a general rectangular configuration. The rectangular configuration of the first surface area 16 is defined by an inboard edge 20 and an opposite outboard edge 22 of the surface area, and a first end edge 24 and an opposite second end edge 26 of the surface area. The first surface area 16 has a width dimension between the inboard edge 20 and the outboard edge 22 and a length dimension between the first end edge 24 and the second end edge 26.

The inboard edge 20 of the first part 12 is formed with a plurality of hinge knuckles 32. The hinge knuckles 32 of the first part 12 are positioned to alternate with the hinge knuckles 32' of the second part 14. A pivot pin 34 is inserted through center holes (not shown) of the interleaved hinge knuckles 32, 32' forming a connection 36 between the first part 12 and the second part 14. The connection 36 enables the first part 12 and the second part 14 to be moved between first and second relative positions.

Figure 4:
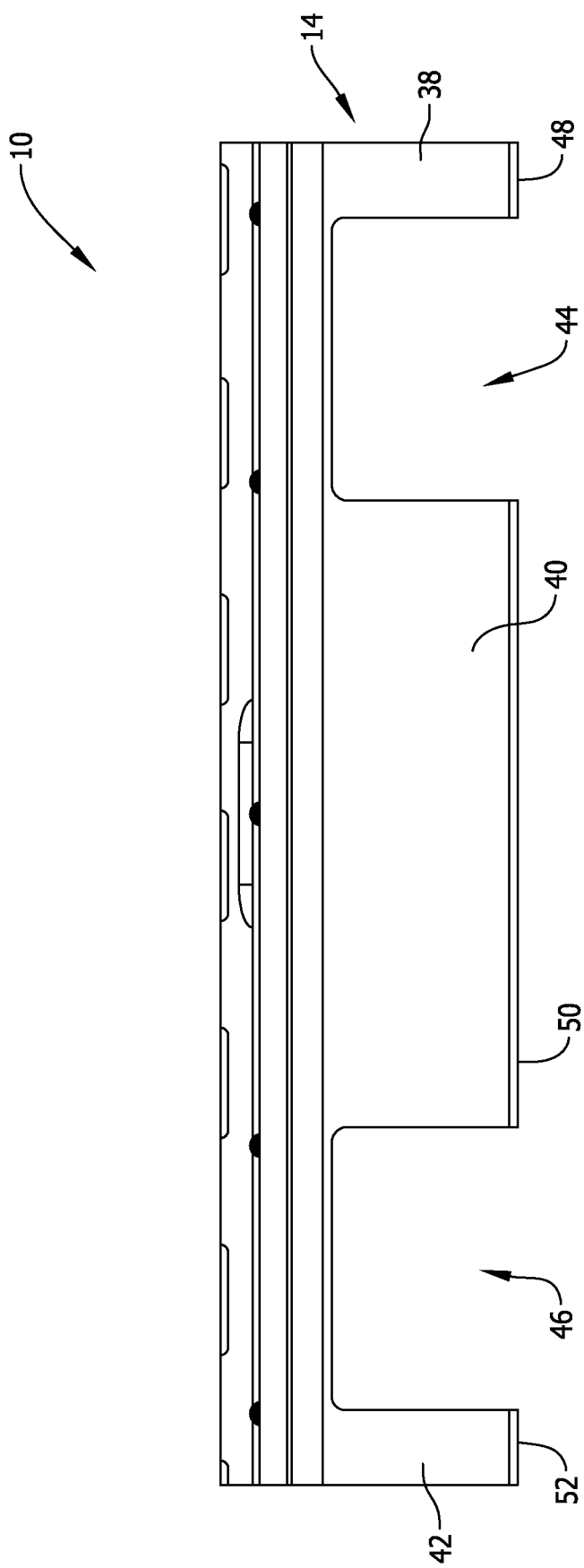
FIG. 4 is a side elevation view of a first side of the protection apparatus, with the opposite side elevation view of the second side of the protection apparatus being a mirror image thereof.

A first support leg 38 is provided on the bottom surface area 18 of the first part 12. The support leg 38 is fixed at an angle relative to the support surface area 16. As best seen in FIG. 4, the first support leg 38 is constructed with three sections 38, 40, 42 with open voids 44, 46 between adjacent sections. The three sections 38, 40, 42 are arranged in line and are spaced across the entire length dimension of the first part 12. In other embodiments the first part 12 could have more than the three leg sections 38, 40, 42 shown, or fewer leg sections. Each of the leg sections 38, 40, 42 projects outwardly from the bottom surface 18 of the first part 12 to respective distal ends 48, 50, 52 of the leg sections.

A first support surface extension 56 is provided on the top surface area 16 of the first part 12. The first support surface extension 56 could be an integral part of the first part 12, or be attached to the first part top surface area 16 by a plurality of threaded fasteners 58 as represented in the drawing figures. The first support surface extension 56 is planar and has a general rectangular configuration. The rectangular configuration is defined by an inboard edge 62 and an opposite outboard edge 64 on opposite sides of the width of the first support surface extension 56, and a first end edge 66 and an opposite second end edge 68 on opposite ends of the length of the first support surface extension 56. As represented in the drawing figures, the first end edge 66 of the first support surface extension 56 is aligned with the first end edge 24 of the top surface area 16 of the first part 12, and the second end edge 68 of the first support surface extension 56 is aligned with the second end edge 26 of the top surface area 16 of the first part 12. The first support surface extension 56 is attached to the top surface area 16 of the first part 12 along the inboard edge 62 of the first support surface extension 56. The width of the first support surface extension 56 projects outwardly from the outboard edge 22 of the first part 12 to the outboard edge 64 of the first support surface extension 56. Thus, the width of the first support surface extension 56 positions the extension outboard edge 64 outwardly from the outboard edge 22 of the top surface area 16 of the first part 12.

Figure 6:
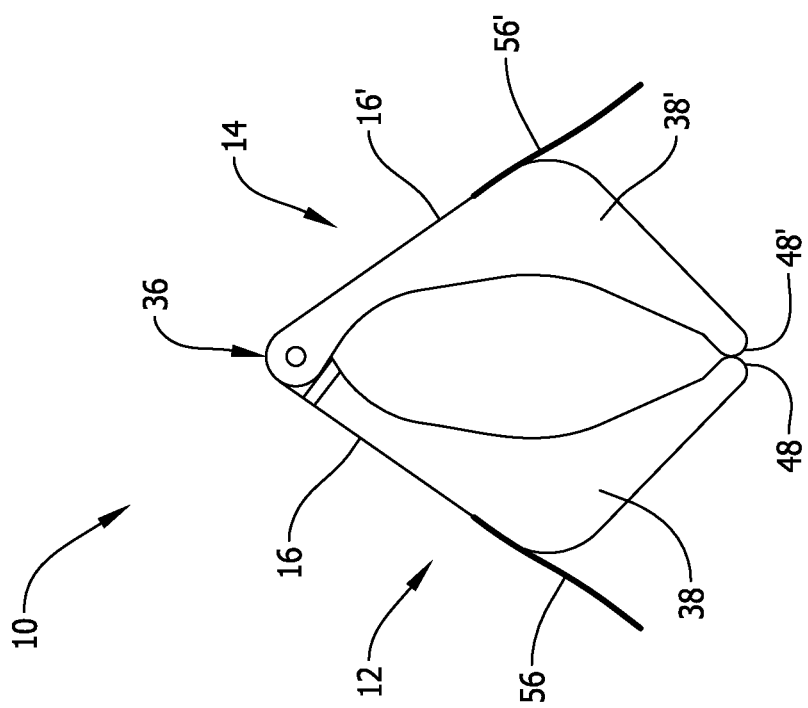
FIG. 6 is an end elevation view of the protection apparatus folded or moved to its collapsed configuration.
Figure 7:
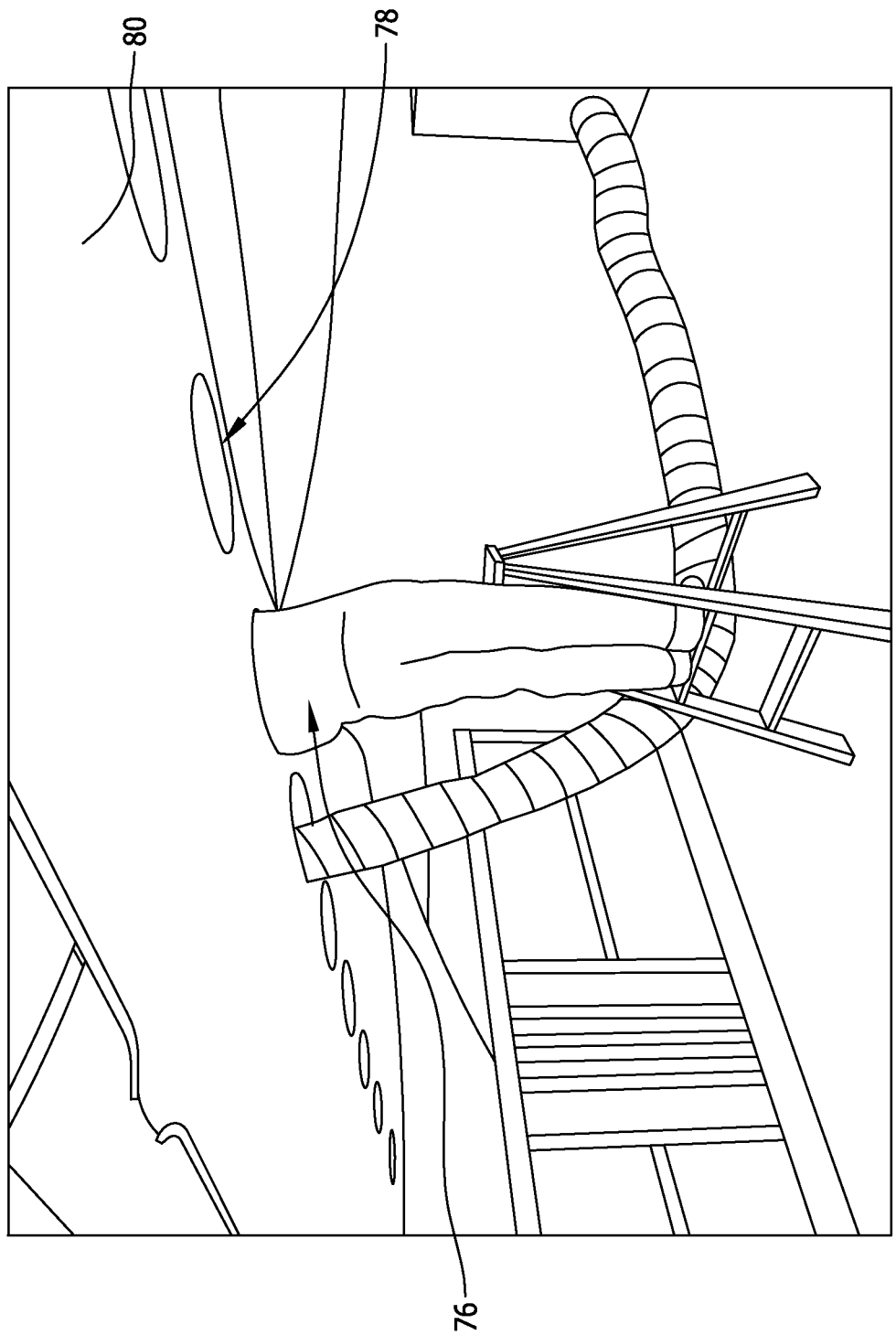
FIG. 7 is a representation of access openings in an aircraft structure.

The connection 36 formed between the first part 12 and the second part 14 by the hinge knuckles 32, 32' and the pivot pin 34 enables the first part 12 and second part 14 to move between first relative positions and second relative positions. In the first relative positions, the first part 12 and second part 14 are moved or folded about the hinge connection 36 to a collapsed, reduced size configuration represented in FIG. 6. In the first relative positions, the distal ends 48, 50, 52, 48', 50', 52' of the support legs are moved toward each other to positions where they are adjacent and contact as represented in FIG. 6. Additionally, the first support surface area 16 of the first part 12 and the first support surface area 16' of the second part 14 are oriented at an angle as represented in FIG. 6. This collapsed configuration of the apparatus 10 provides the apparatus 10 with a reduced size configuration that enables a worker 76 to insert the apparatus 10 end first through an access opening 78 in an aircraft structure 80 and into the interior of the aircraft structure as represented in FIG. 7.

Once the apparatus 10 is in the interior of the aircraft structure, a worker can move the collapsed apparatus 10 to a work site location in the interior where the apparatus 10 is used to protect previously constructed components of the aircraft structure while further construction is performed by the worker in the aircraft structure interior.

Figure 5:
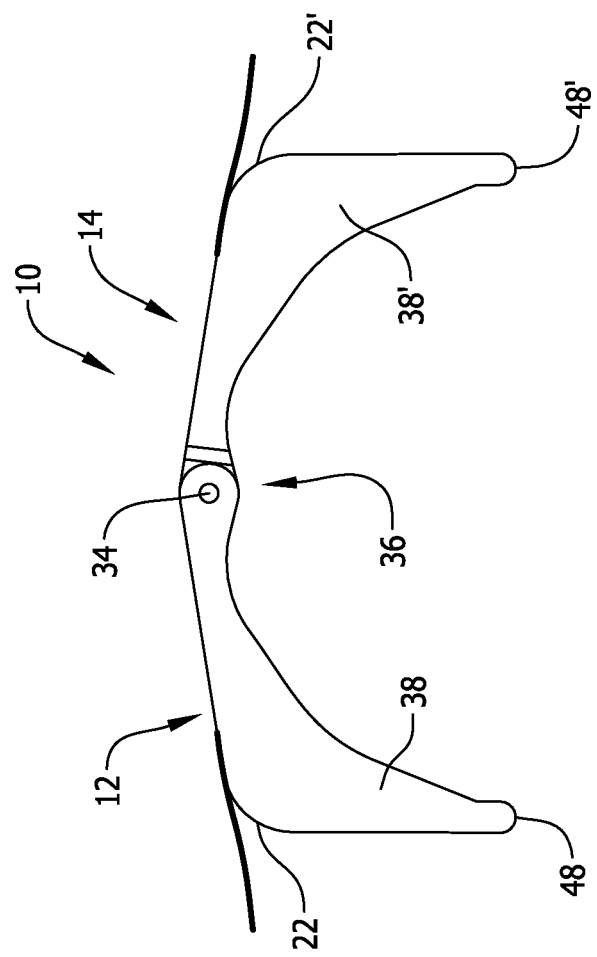
FIG. 5 is an end elevation view of a first end of the protection apparatus, with the opposite end elevation view of the second end of the protection apparatus being a mirror image thereof.
Figure 8:
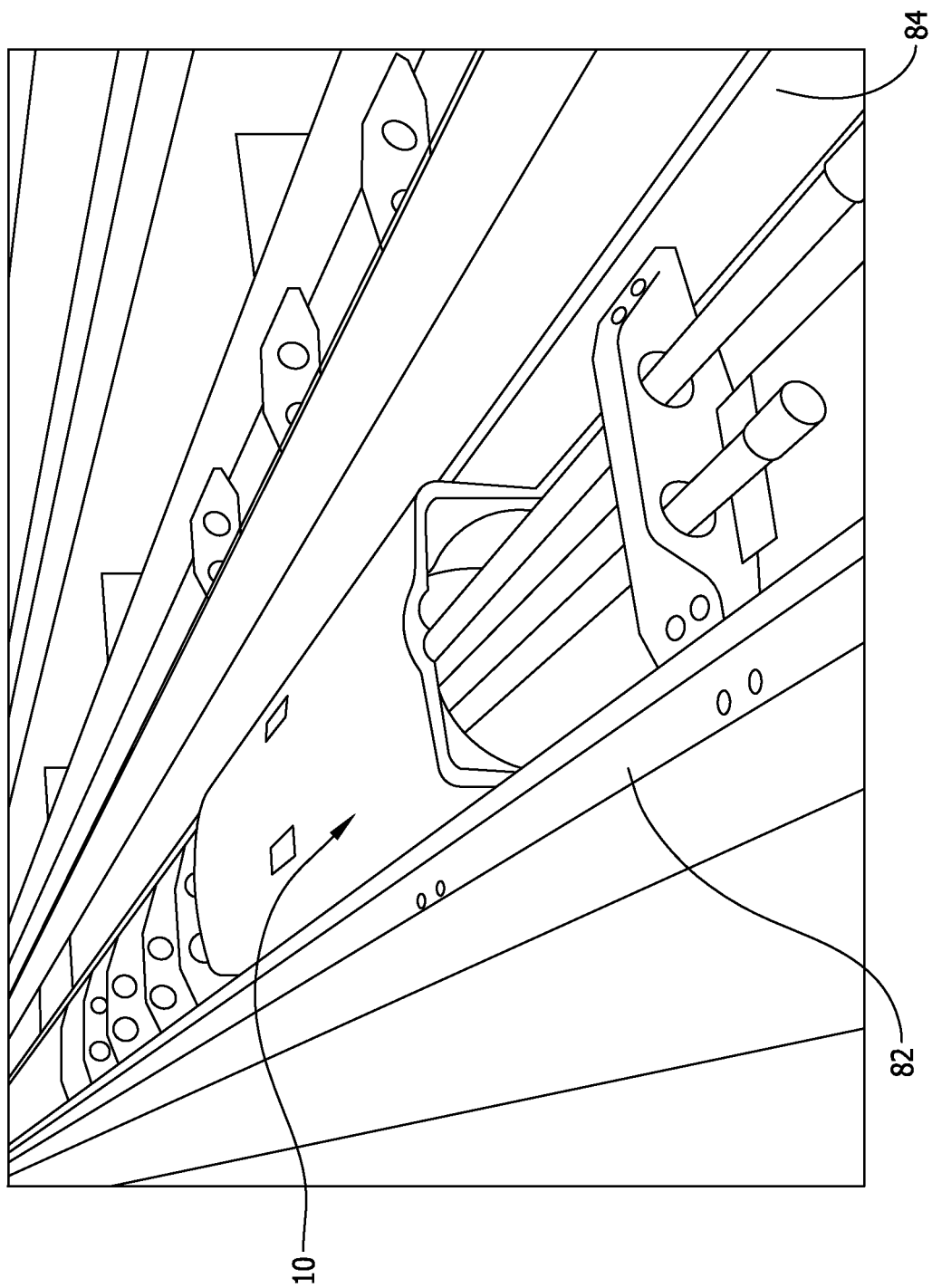
FIG. 8 is a representation of use of the apparatus in the interior of an aircraft structure.

Once at the work site in the aircraft structure interior, the apparatus 10 can then be unfolded to its enlarged configuration where the first part 12 and the second part 14 are moved to their second relative positions. In the second relative positions of the first part 12 and the second part 14, the distal ends of the first support leg 48, 50, 52 and the distal ends of the second support leg 48', 50', 52' are spaced from each other as represented in FIGS. 1 and 5. The spacing between the first leg distal ends 48, 50, 52 and the second leg distal ends 48', 50', 52' enables the legs to be positioned on an interior surface of the aircraft structure on opposite sides of a previously constructed component to be protected by the apparatus as represented in FIG. 8. Additionally, the distance between the first leg distal ends 48, 50, 52 and the second leg distal ends 48', 50', 52' enables the support legs to be positioned against adjacent stringers 82, 84 in the interior of the aircraft structure as represented in FIG. 8. This engagement of the support legs 38, 40, 42, 38', 40', 42' with the adjacent stringers 82, 84 provides further support to the apparatus 10. In the second relative positions of the first part 12 and the second part 14, the first support surface area 16 and the second support surface area 16' form a continuous support surface over the previously constructed components in the interior of the aircraft structure. The continuous support surface protects the previously constructed components from potential damage by the worker working at the work site, for example from a dropped tool or a worker inadvertently exerting a force against the previously constructed component.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A protection apparatus comprising:
 a support surface on a top of the protection apparatus and a bottom surface on a bottom of the protection apparatus;
 a first support leg on the bottom surface, the first support let projecting outwardly from the bottom surface to a distal end of the first support leg, the first support leg being fixed at an angle relative to the support surface;
 a second support leg on the bottom surface, the second support leg projecting outwardly from the bottom surface to a distal end of the second support leg, the second support leg being fixed at an angle relative to the support surface;
 the first support leg and the second support leg being movable toward and away from each other;
 with the first support leg and the second support leg being moved away from each other, the distal end of the first support leg and the distal end of the second support leg are positioned at opposite sides of the support surface at a distance apart that corresponds to a spacing between adjacent stringers of an aircraft structure that enables the first support leg and the second support leg to be positioned between the adjacent stringers of the aircraft structure and support the support structure over components of the aircraft structure between the adjacent stringers;
 a first part of the protection apparatus, the first part having a first support surface area that is a portion of the support surface on the top of the protection apparatus, and the first part having a first bottom surface area that is a portion of the bottom surface on the bottom of the protection apparatus;
 the first support leg being on the first bottom surface area;
 a second part of the protection apparatus, the second part of the protection apparatus having a second support surface area that is a portion of the support surface on the top of the protection apparatus, and the second part having a second bottom surface area that is a portion of the bottom surface on the bottom of the protection apparatus;
 the second support leg being on the second bottom surface area;
 the first part and the second part being separate parts of the protection apparatus;
 a connection connecting the first part and the second part; and,
 the first part and the second part being mirror images of each other.

2. The protection apparatus of claim 1, further comprising:
 the support surface being a flat surface.

3. The protection apparatus of claim 1, further comprising:
 the first support surface area being a flat surface; and,
 the second support surface area being a flat surface.

4. The protection apparatus of claim 1, further comprising:
 the connection enabling the first part and the second part to move relative to each other.

5. The protection apparatus of claim 1, further comprising:
 the connection enabling the first part and the second part to pivot relative to each other.

6. The protection apparatus of claim 1, further comprising:
 the connection enabling the first part and the second part to move between first relative positions and second relative positions of the first part and the second part where in the first relative positions the distal end of the first support leg and the distal end of the second support leg are adjacent and the first support surface area and the second support surface area are oriented at an angle and in the second relative positions the distal end of the first support leg and the distal end of the second support leg are spaced the distance apart and the first support surface area and the second support surface area form a continuous support surface.

7. The protection apparatus of claim 1, further comprising:
 a first surface extension, the first surface extension extending from the support surface outwardly from the first support leg; and,
 a second surface extension, the second surface extension extending from the support surface outwardly from the second support leg.

8. The protection apparatus of claim 1, further comprising:
 the protection apparatus is constructed of a rigid plastic configuring the protection apparatus for manual manipulation and movement by a worker.

9. The protection apparatus of claim 1, further comprising:
   the first part is formed with a plurality of hinge knuckles;
   the second part is formed with a plurality of hinged knuckles; and,
   the hinge knuckles of the first part are positioned to alternate with the hinge knuckles of the second part.

10. The protection apparatus of claim 1, further comprising:
    the first support leg and the second support leg are configured for positioning against the adjacent stringers of the aircraft structure providing further support to the protection apparatus.

11. A protection apparatus comprising:
    a first part of the protection apparatus, the first part having a first support surface area on a top of the first part and a first bottom surface area on a bottom of the first part;
    a first support leg on the first bottom surface of the first part, the first support leg being fixed at an angle relative to the first support surface area, the first support leg projecting outwardly from the first bottom surface to a distal end of the first support leg;
    a second part of the protection apparatus, the second part having a second support surface area on a top of the second part and a second bottom surface area on a bottom of the second part;
    a second support leg on the second bottom surface area of the second part, the second support leg being fixed at an angle relative to the second support surface area, the second support leg projecting outwardly from the second bottom surface area to a distal end of the second support leg;
    a connection between the first part and the second part, the connection enabling the first part and the second part to move between first relative positions and second relative positions of the first part and the second part where in the first relative positions the distal end of the first support leg and the distal end of the second support leg are adjacent and the first support surface area and the second support surface area are oriented at an angle and in the second relative positions the distal end of the first support leg and the distal end of the second support leg are spaced a distance apart and the first support surface area and the second support surface area form a continuous support surface; and,
    the first part and the second part being mirror images of each other.

12. The protection apparatus of claim 11, further comprising:
    the first support leg projecting outwardly from an outboard edge of the first support surface area; and,
    the second support leg projecting outwardly from an outboard edge of the second support surface area.

13. The protection apparatus of claim 11, further comprising:
    the first support surface area being a flat surface; and,
    the second support surface area being a flat surface.

14. The protection apparatus of claim 11, further comprising:
    the connection between the first part and the second part being a hinge that enables the first part and the second part to pivot relative to each other.

15. The protection apparatus of claim 11, further comprising:
    in the first relative positions of the first part and the second part the distal end of the first support leg and the distal end of the second support leg contact.

16. The protection apparatus of claim 11, further comprising:
    the first support surface area being planar, the first support surface area having a general rectangular configuration with an inboard edge and an outboard edge on opposite sides of the first support surface area and a first end edge and a second end edge at opposite ends of the first support surface area; and,
    the second support surface area being planar, the second support surface area having a general rectangular configuration with an inboard edge and an outboard edge on opposite sides of the second support surface area and a first end edge and a second end edge at opposite ends of the second support surface area.

17. The protection apparatus of claim 16, further comprising:
    a first support surface extension on the first support surface area, the first support surface extension being planar, the first support surface extension having a general rectangular configuration with an inboard edge and an outboard edge on opposite sides of the first support surface extension and a first end edge and a second end edge at opposite ends of the first support surface extension, the first end edge of the first support surface extension being aligned with the first end edge of the first support surface area and the second end edge of the first support surface extension being aligned with the second end edge of the first support surface area, the first support surface extension being attached to the first support surface area along the inboard edge of the first support surface extension with a width dimension of the first support surface extension positioning the outboard edge of the first support surface extension outwardly from the outboard edge of the first support surface area and outwardly from the first support leg; and,
    a second support surface extension on the second support surface area, the second support surface extension being planar, the second support surface extension having a general rectangular configuration with an inboard edge and an outboard edge on opposite sides of the second support surface extension and a first end edge and a second end edge at opposite ends of the second support surface extension, the first end edge of the second support surface extension being aligned with the first end edge of the second support surface area and the second end edge of the second support surface extension being aligned with the second end edge of the second support surface area, the second support surface extension being attached to the second support surface area along the inboard edge of the second support surface extension and a width dimension of the second support surface extension positioning the outboard edge of the second support surface extension outwardly from the outboard edge of the second support surface area and outwardly from the second support leg.

18. The protection apparatus of claim 11, further comprising:
    The protection apparatus is constructed of a rigid plastic configuring the protection apparatus for manual manipulation and movement by a worker.

19. The protection apparatus of claim 11, further comprising:
    the first part is formed with a plurality of hinge knuckles;
    the second part is formed with a plurality of hinged knuckles; and, the hinge knuckles of the first part are positioned to alternate with the hinge knuckles of the second part.

20. The protection apparatus of claim 11, further comprising:
the first support leg and the second support leg are configured for positioning against adjacent stringers of an aircraft structure providing support to the protection apparatus.

* * * * *